United States Patent
Bottazzi et al.

(10) Patent No.: US 7,620,475 B1
(45) Date of Patent: Nov. 17, 2009

(54) DISPENSING DEVICE OF PORTABLE TERMINALS FOR ACQUIRING PRODUCT DATA IN A SHOPPING CENTRE, INTEGRATED SYSTEM FOR DISPENSING SAID PORTABLE TERMINALS, AND INTEGRATED SYSTEM FOR SELLING PRODUCTS THROUGH THE USE OF PORTABLE TERMINALS

(75) Inventors: Marco Bottazzi, Ferrara (IT); Luigi Frison, Mira (IT); Paolo Mazzocato, Treviso (IT); Maurizio Scaramella, Udine (IT); Toshiyuki Yoshino, Milan (IT)

(73) Assignee: Datalogic, S.p.A., Bologna (IT)

( * ) Notice: Subject to any disclaimer, the term of this patent is extended or adjusted under 35 U.S.C. 154(b) by 0 days.

(21) Appl. No.: 09/657,519

(22) Filed: Sep. 8, 2000

(30) Foreign Application Priority Data

Jun. 6, 2000 (EP) ................................. 00830404

(51) Int. Cl.
*G06F 17/00* (2006.01)
(52) U.S. Cl. ..................... 700/236; 700/237; 700/214; 235/383; 235/385; 235/462.45; 235/472.01
(58) Field of Classification Search ................ 700/214, 700/215, 225, 227, 234, 236, 237, 242, 244; 345/462; 705/10; 235/383, 385, 462.45, 235/472.01, 380
See application file for complete search history.

(56) References Cited

U.S. PATENT DOCUMENTS

| | | | | |
|---|---|---|---|---|
| 4,673,932 A | * | 6/1987 | Ekchian et al. | 340/10.32 |
| 5,397,882 A | * | 3/1995 | Van Solt | 235/381 |
| 5,468,942 A | * | 11/1995 | Oosterveen et al. | 235/383 |
| 5,468,948 A | * | 11/1995 | Koenck et al. | 235/472.01 |
| 5,489,773 A | | 2/1996 | Kumar | |
| 5,595,264 A | | 1/1997 | Trotta, Jr. | |
| 5,621,640 A | * | 4/1997 | Burke | 705/14 |
| 5,696,366 A | * | 12/1997 | Ziarno | 235/380 |
| 5,805,474 A | * | 9/1998 | Danielson et al. | 361/683 |

(Continued)

FOREIGN PATENT DOCUMENTS

DE    196 29 139    1/1998

(Continued)

OTHER PUBLICATIONS

*IBM Technical Disclosure Bulletin*, vol. 35, No. 1A, Jun. 1992 "Portable Self-Checkout Retail System".

*Primary Examiner*—Jeffrey A Shapiro
(74) *Attorney, Agent, or Firm*—Nixon & Vanderhye, P.C.

(57) ABSTRACT

A dispensing device of portable terminals for acquiring product data in a shopping centre comprises a plurality of static cradles for a corresponding plurality of portable terminals. The terminals are adapted to be withdrawn and used by the customers for acquiring product data. The dispenser has a customer verification unit which identifies each customer enabled to the use of the portable terminals, a communication unit for communicating to each identified customer a terminal to be withdrawn for carrying out the product data acquisition, and a control and data processing unit adapted to control the customer verification unit and the communication unit and to process the product data acquired through said terminals. The plurality of cradles is housed into a substantially flat portion of the container provided in close proximity of the customer identification means so as to allow access to the plurality of terminals.

57 Claims, 2 Drawing Sheets

U.S. PATENT DOCUMENTS

| | | | |
|---|---|---|---|
| 6,157,005 A * | 12/2000 | Lu | 219/400 |
| 6,164,546 A * | 12/2000 | Kumagai et al. | 235/472.01 |
| 6,199,753 B1 * | 3/2001 | Tracy et al. | 235/375 |
| 6,640,214 B1 * | 10/2003 | Nambudiri et al. | 705/26 |

FOREIGN PATENT DOCUMENTS

| | | |
|---|---|---|
| DE | 197 08 020 | 8/1998 |
| EP | 0 856 812 A2 | 8/1998 |
| WO | WO 91/19961 | 12/1991 |
| WO | WO 93/04449 | 3/1993 |
| WO | WO 98/44462 | 10/1998 |
| WO | WO 98/55954 | 12/1998 |

\* cited by examiner

DISPENSING DEVICE OF PORTABLE TERMINALS FOR ACQUIRING PRODUCT DATA IN A SHOPPING CENTRE, INTEGRATED SYSTEM FOR DISPENSING SAID PORTABLE TERMINALS, AND INTEGRATED SYSTEM FOR SELLING PRODUCTS THROUGH THE USE OF PORTABLE TERMINALS

BACKGROUND OF THE INVENTION

I. Field of the Invention

The present invention relates to a dispensing device of portable terminals for acquiring product data in a shopping centre. The invention also relates to an integrated system for dispensing portable terminals in a shopping centre and to an integrated system for selling products through the use of portable terminals for acquiring the product data.

Preferably, but not exclusively, the terminal dispensing device of the present invention is adapted to be used in medium-large sized shops for the purpose of realising a self-service shopping system, and in particular, a self-scanning shopping system.

In the following description and claims, the expression "self-service shopping system" refers to a shopping system wherein the customer directly takes the products he intends to buy from the shelves of the shopping centre and puts them into a trolley or basket; then, he goes to a checkout counter where an operator of the shopping centre passes said products one by one on an optical detector for reading its optical code, so as to finally compute the total amount to be paid.

II. Related Art and Other Considerations

The expression "self-scanning shopping system" refers to a self-service shopping system wherein the optical code reading is not carried out by the operator of the shopping centre assigned to the checkout counter, but by the customer himself, through a special portable terminal previously taken from a special terminal dispensing device provided into the shopping centre. In such shopping system, the customer reads the optical code of the products he intends to buy as he takes them off the shelves of the shopping centre, and before putting them into the trolley or basket. At the end of the shopping operations, the customer places the terminal back into the device from which he had taken it. He withdraws from the same a ticket showing the amount to be paid and goes to the checkout counter to make the payment after having handed over the ticket. Alternatively, the customer directly goes to the checkout counter of the shopping centre with the terminal; the latter is given to an operator of the shopping centre who, through a suitable device, downloads the data stored into the terminal, so as to finally calculate the total amount to be paid.

As known, self-scanning shopping systems allow to remarkably speed up the checking operations carried out by the checkout-counter operators in shopping centres, relieving them of the burden of carrying out optical-code reading operations on the single products. In fact, the operations often cause long queues at the checkout counters, especially at particular rush hours, such as for example, the closing time.

Devices for dispensing portable terminals for allowing to carry out a self-scanning shopping system in a shopping centre are known.

U.S. Pat. No. 5,468,942 describes a device for dispensing portable terminals for a self-scanning shopping system, comprising a rack consisting of several vertically arranged compartments, each adapted to house a portable terminal. Moreover, the device comprises an identification unit of the customers of the shopping centre enabled to the use of the portable terminals. The unit is arranged, in the shopping centre, next to the rack. The device also comprises a computer wherein the data relating to the customers enabled to the use of the terminals are stored. The computer controls the customer identification unit and indicates, to each identified customer, the terminal to be withdrawn by activating suitable visual indication means provided in the proximity of the terminals, or by displaying said indications on a small display. At the end of the shopping operations, the customers places the terminal back into its compartment, and withdraws from the device a ticket showing the total amount to be paid. Then the ticket is handed over to a checkout counter operator, who registers the payment made by the customer.

Although suitable for carrying out a self-scanning shopping system, the use of a device of the type described above implies a series of drawbacks.

A first drawback relates to the wall-arrangement and to the large size of the rack which takes up much space, thus reducing the exhibiting area of the shopping centre. Thus, its arrangement in the shopping centre cannot be casual, but it is limited to particular areas thereof. These areas must be suitably arranged to house the rack. Thus, they must be accurately determined according to the inner layout of the shopping centre and during the organisation of the layout.

A second drawback relates to the difficulty of identifying the terminal to be withdrawn by the client. The client, in fact, must first identify himself at the identification unit. Then he must move in front of the rack to take the terminal assigned to him. Depending on the position of the terminal in the rack, its withdrawal can be quite difficult.

A further drawback of the device for dispensing portable terminals described above relates to the fact that, as it is a closed-architecture device, it is not adapted to meet any possible requirements of expansion and adaptation.

The European patent application no. 98905414.3 describes a device for automatically dispensing portable terminals for a self-scanning shopping system, comprising a container internally provided with a plurality of compartments for a corresponding plurality of terminals for reading a bar code and storing the data coded therein. The container further comprises means for identifying the customers enabled to the use of the portable terminals, and means for moving the compartments into the container so as to selectively face one of them to at least one door provided onto the container. The movement of the compartments is driven by a control unit, which also drives the opening of the door once the customer has been identified. Each compartment is provided with connectors adapted to co-operate with respective connectors provided onto the terminal housed therein.

Although compact and functional for identifying the terminal to be withdrawn, the above described dispensing device exhibits some drawbacks related to the presence of the means for moving the compartments, and in particular, to the presence of sliding contacts between mobile and fixed portions of the dispensing device. These features imply significant difficulties of construction, installation and operation.

The technical problem at the basis of the present invention is that of providing a system for dispensing portable terminals which should exhibit features of compactness, functionality and construction simplicity, overcoming at the same time the disadvantages illustrated above with reference to the dispensing devices of portable terminals of the prior art.

SUMMARY

Thus, in a first aspect thereof, the present invention relates to a dispensing device of portable terminals for acquiring product data in a shopping centre, comprising:
- a plurality of static cradles for a corresponding plurality of portable terminals adapted to be withdrawn and used by the customers of a shopping centre for acquiring product data;
- means for identifying each customer enabled to the use of the portable terminals;
- means for communicating to each identified customer a terminal to be withdrawn for carrying out the product data acquisition;
- a data control and processing unit adapted to control the above identification and communication means of/to the customer, and to process the product data acquired through said terminals;

characterised in that said plurality of cradles, said identification and communication means of/to the customer, and said control unit are housed into a single container, and in that said plurality of cradles is housed into a substantially flat portion of said container provided in close proximity of the customer identification means so as to allow them to immediately and easily access to said plurality of terminals.

In the following description and claims, the expression "product data" refers to a series of identifying information on the product, expressed as a code, such as for example those coded in an optical code, in a magnetic code or in an electronic code, for example a TAG or an electronic label, that can be queried by radiofrequency signals (RFID). Moreover, the content of magnetic and electronic codes can be changed by the read/write device. The term "optical code" indicates a code (such as for example, a bar code, a bidimensional code, or alike) capable of univocally identifying the products on which it is placed through a series of information coded therein, such as for example cost, type of product, etc. For the purpose of simplifying the present description, in the following description explicit reference shall be often made to bar codes, it being understood that what said is similarly applicable also for the other types of illustrated codes (optical, magnetic and electronic), and for processing images from which it is possible to extract an information content.

The expression "portable terminal", in this text, indicates a portable device capable of reading optical, magnetic and electronic codes, of elaborating images and of changing, that is of writing, magnetic and electronic codes, said devices being also capable of comprising or not storage and/or computing means.

Advantageously, the dispensing device of portable terminals of the present invention is extremely compact and functional. The absence of moving parts implies the achieving of clear constructive, installation and operation advantages with respect to the dispensing device described in the European patent application no. 98905414.3, whereas the grouping of all constructive components into a single container, and the particular arrangement of the cradles for the terminals in close proximity of the customer identification means allows to remarkably reduce the exhibiting area taken up into the shopping centre and to facilitate and speed up the identification and withdrawal operation of the terminal assigned to the identified customer. Moreover, thanks to its features of compactness, the dispensing device of the present invention can be advantageously arranged in various areas of the shopping centre, without implying any particular problem in the selection and arrangement of the same areas. Thus, said dispensing device exhibits functionality and flexibility features that make it totally independent of the internal layout of the shopping centre, and as a consequence, adaptable to any type of layout, thus overcoming the disadvantages illustrated above with reference to the dispensing device described in U.S. Pat. No. 5,468,942.

Preferably, the terminal housing portion is substantially horizontal. This further facilitates the identification and the withdrawal of the terminals from the container; in fact, the customer has an immediate and complete view of all the available terminals, and he can easily withdraw the one that has been assigned to him with a minimum movement with respect to the identification means.

Preferably, the terminal housing portion comprises a box-shaped body including a plurality of compartments constituting said plurality of terminal cradles. Even more preferably, each compartment of said plurality of compartments is adapted to house a terminal of said plurality of terminals, and it comprises locking/unlocking means of the terminal housed therein. In this way, it is possible to prevent the withdrawal and use of the terminals to any person not correctly identified and authorised.

Preferably, the container comprises a circuit for charging/discharging the terminal batteries. Thus, the recharge of said batteries can be advantageously carried out any time the terminal is housed into the compartment, so as to dispense to the customers terminals always provided with sufficient charge endurance and/or regenerate the batteries, using for example the times of inactivity of the dispensing device (for example, low-stream hours, closing hours, etc.)

Even more preferably, the box-shaped body comprises first electric connectors adapted to co-operate with second electric connectors provided on the terminals, for the purpose of allowing the recharge of the batteries of the latter, and/or uploading and downloading data to/from the terminal. Besides being possible through electric connectors, the data upload and download can be carried out also through optical (for example, IrDA) or radio communication. In particular, the download of the data stored during the self-scanning operations allows to proceed, afterwards, to the computing of the overall amount to be paid.

According to a preferred embodiment of the dispensing device of the present invention, each compartment of said plurality of compartments comprises:
- a first upper aperture for inserting the terminal, wherein a vertical axis and a terminal insertion axis inclined by a predetermined angle with respect to the vertical axis are defined;
- a second lower service aperture below the first aperture for inserting the terminal;
- guiding means of the terminal into the compartment.

Advantageously, the compartments are hence open downwards, so as to allow the discharge of small objects that may be accidentally inserted therein, and for preventing dust gathering inside them. Said discharge is facilitated by the oblique arrangement of the terminal into the compartments. In fact, the presence of objects and/or dust into the compartment, and in particular, on the connectors provided therein, would be a hindrance to the correct carrying out of the terminal battery recharge and/or of the data uploading/downloading operations to/from the terminal.

Preferably, the second aperture has a size larger than that of said first aperture, for the purpose of further facilitating the discharge of objects and/or dust from the compartments.

Preferably, each compartment of said plurality of compartments comprises a terminal support element arranged outside the projection of the first aperture along the vertical axis. Even more preferably, said terminal support element comprises opposed guiding walls inclined by said predetermined angle with respect to said vertical axis, wherein one of said walls comprises a support step for a lower end of the terminal, arranged outside the projection of the first aperture along the vertical axis. The particular arrangement of the terminal support element into the compartment and the oblique arrangement of the terminal into the same allow to achieve the advantages mentioned above in a constructively simple and functional way.

Preferably, said box-shaped body comprises a covering surface provided with a plurality of holes at said first terminal insertion apertures. The external cover of the terminal holder shelf allows to achieve aesthetic and functional advantages. In fact, the dispensing device of the invention is intended to be installed in environments open to the public; thus, it is required to have a good aesthetic finishing; moreover, said cover allows reducing the risks of accidentally introducing objects into the compartments.

Preferably, the container comprises means for moving the same, for example wheels. Thus, the dispensing device of the invention is movable, thus making easier the arrangement and movement of the same into the shopping centre, without requiring the intervention of external service personnel; this contributes to make the dispensing device of the invention adaptable to any type of inner layout of the shopping centre. Even more advantageously, the container comprises means for locking the wheels, so as to prevent any further movement of the dispensing device once it has been arranged in the desired position into the shopping centre.

According to various embodiments of the dispensing device of the present invention, the customer identification means can comprise at least any one of the following means: a magnetic card reader, a smart card reader, a bar code card reader, an optical receiver, a radio or mobile phone receiver, a fingerprint reader, a fingerprint or retina detector, a device for entering a numerical code, a voice detector.

According to various embodiments of the dispensing device of the present invention, the means for communicating to the identified customers the terminals to be taken can comprise at least any one of the following means: visual communication means on display or monitor, visual communication means in the proximity of each cradle of said plurality of cradles, sound or voice communication means, terminal lifting means provided into each cradle of said plurality of cradles.

Preferably, each compartment comprises at least one sensor for indicating the presence and/or correct arrangement of the terminal into the compartment.

Advantageously, the use of more sensors allows not only to detect the presence of the terminal into the compartment, but also the accidental presence of foreign matters, as they cause an incorrect arrangement of the terminal into the compartment.

Preferably, said container comprises means for printing tickets and/or information coupons, marketing messages, promotions, discount vouchers, etc., directed to the customer before or after the product purchase step.

Preferably, the dispensing device of the present invention further comprises data transmission and/or reception means to and from optical and/or radio terminals, so as to allow a reciprocal information exchange.

In a second aspect thereof, the invention relates to an integrated system for the automatic dispensing of portable terminals for acquiring product data in a shopping centre, characterised in that it comprises:

at least one dispensing device of portable terminals;

a control station of said at least one terminal dispensing device;

a connection network between said at least one terminal dispensing device and said control station for allowing the exchange of information between them.

Preferably, said terminal dispensing device is a dispensing device according to the present invention of the type described above. Through said system for dispensing terminals, it is possible to achieve all the advantages described above with reference to the dispensing device of the present invention.

According to a preferred embodiment of the integrated system for dispensing terminals of the present invention, the control station is in remote position with respect to said at least one terminal dispensing device.

In a first embodiment, the connection network is a wired local network (for example, Ethernet). Alternatively, the connection network is a wireless (for example, radio), or a geographic area network.

In a third aspect thereof, the invention relates to an integrated system for selling products in a shopping centre through the use of portable terminals, characterised in that it comprises:

an integrated system for dispensing terminals of the type described above;

means for downloading the product data acquired through the terminals;

means for computing, as a function of the acquired data, an amount to be paid.

Through said sales system it is possible to achieve all the advantages described above with reference to the dispensing device of the present invention.

Preferably, said integrated system for product sale preferably comprises at least one cash register for the payment of said amount.

According to a first embodiment of the sales system of the present invention, said means for downloading the product data acquired through the terminals is housed into the terminal dispensing device.

According to an alternative embodiment of the sales system of the present invention, said means for downloading the product data acquired through the terminals is provided in remote position with respect to the terminal dispensing device.

BRIEF DESCRIPTION OF THE DRAWINGS

Further features and advantages of the present invention will appear more clearly from the following detailed description of some preferred embodiments, made with reference to the attached drawings. In such drawings:

FIG. 3 shows a schematic view of a first embodiment of a system for dispensing terminals according to the present invention;

FIG. 4 shows a schematic view of an alternative embodiment of the system for dispensing terminals of FIG. 3.

DETAILED DESCRIPTION

Figure 1:
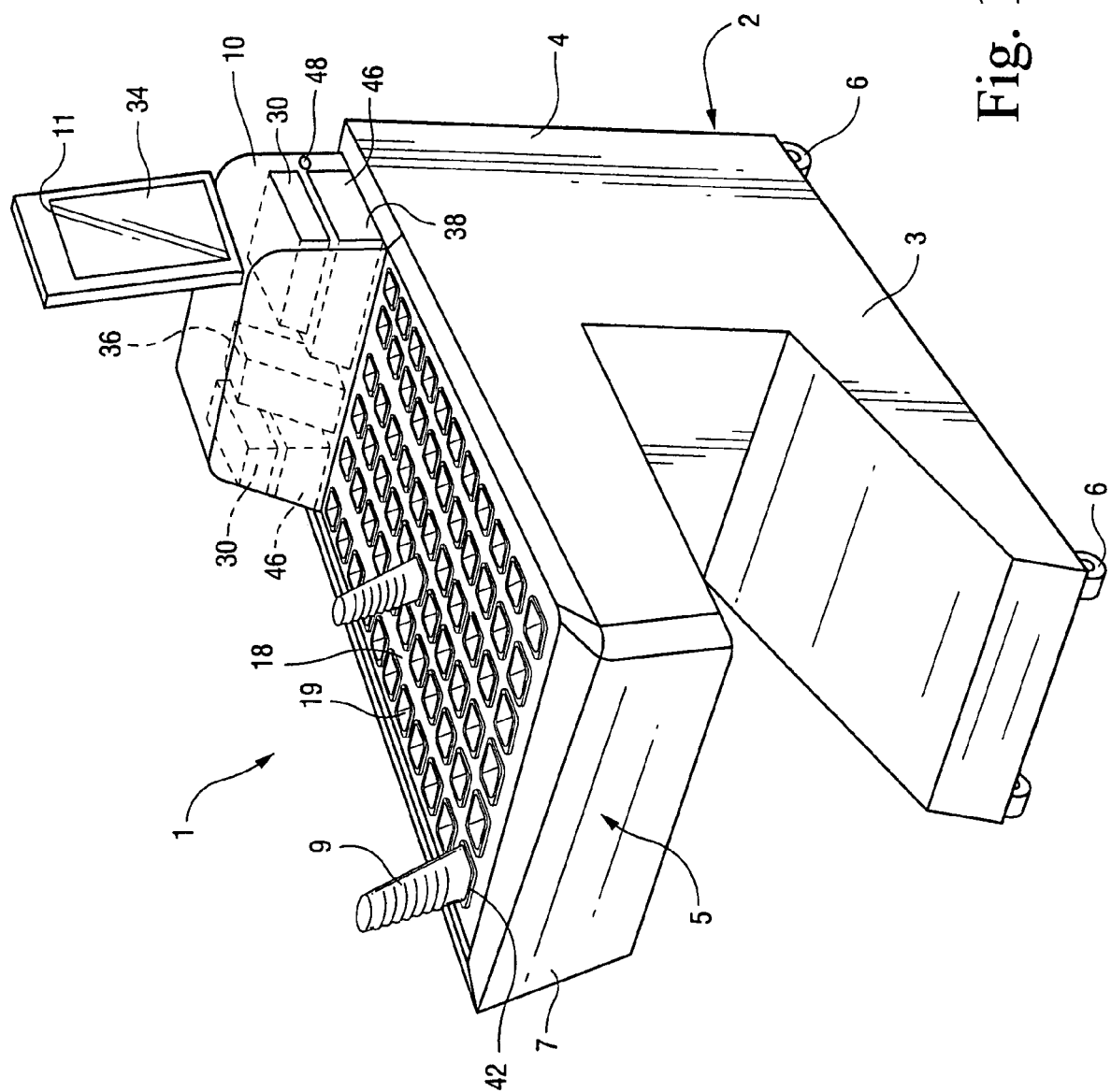
FIG. 1 shows a perspective view of a terminal dispensing device according to the present invention.

In the figures, reference numeral 1 indicates a dispensing device of portable terminals for acquiring product data in a shopping centre. Dispensing device 1 is preferably intended to be used in medium-large shopping centres for the purpose of implementing a self-scanning shopping system.

The dispensing device 1 comprises of a single container 2 provided with a support base 3, a main body 4, and a substantially flat and horizontal shelf portion 5. The support base 3 is provided with wheels 6 for allowing the dispensing device 1 to be moved into the shopping centre.

The shelf portion 5, in particular, comprises a box-shaped body 7 internally provided with a structure with matrix organisation. The body 7 comprises a metal grating provided with a plurality of compartments 8, defining static cradles for portable terminals 9 adapted to be withdrawn and used by the customers of the shopping centre authorised to their use. The compartments 8 (66 such compartments in the specific example, represented in FIG. 1, arranged in a matrix of 11 rows on 6 columns) are divided into boxes. In the example of FIG. 1, each box has 6 compartments.

Moreover, the container 2 comprises a body 10 arranged next to the shelf portion 5 and above the main body 4. Body 10 comprises identification means 30 for identifying the customers enabled to use the portable terminals. The identification means 30 can be of various types, such as, for example: a magnetic card reader, a smart card reader, a bar code card reader, an optical receiver, a radio or mobile phone receiver, a fingerprint reader, a fingerprint or retina detector, a device for entering a numerical code (alphanumeric keyboard), a touch screen, a voice detector, etc.

Moreover, container 2 comprises means 34 for communicating to the identified customers the terminal to be withdrawn. The communication means 34 can be of various types, including (for example): visual indication means on a display or monitor 11, visual indication means in the proximity of each cradle of said plurality of cradles (for example a LED), sound or voice indication means through loudspeakers, terminal lifting means provided into each cradle of said plurality of cradles (for example, electromechanical or magnetic lifting means).

Inside the body 4 there is housed a control and data processing unit 36 adapted to control the customer identification means 30, the customer indication means 34 of the terminals 9 to be withdrawn, and a means 38 for generating marketing and/or promotional information and/or discount vouchers. Moreover, the control and data processing unit processes the data stored in terminal 9 during the purchase operations so as to allow different processing operations, such as for example, computing the overall amount to be paid for that purchase operation, or creating a database with information on the customers' purchase habits, processing reports, etc.

The customer identification means and the terminal compartments 8 are advantageously arranged in close proximity one to the others so as to allow the customers that have carried out the identification operations, to accomplish an easy and immediate withdrawal of terminals 9 from the compartments 8 of the shelf portion 5 of container 2.

In the following description, the components of the dispensing device 1 of the invention mentioned above shall be described more in detail.

Figure 2:
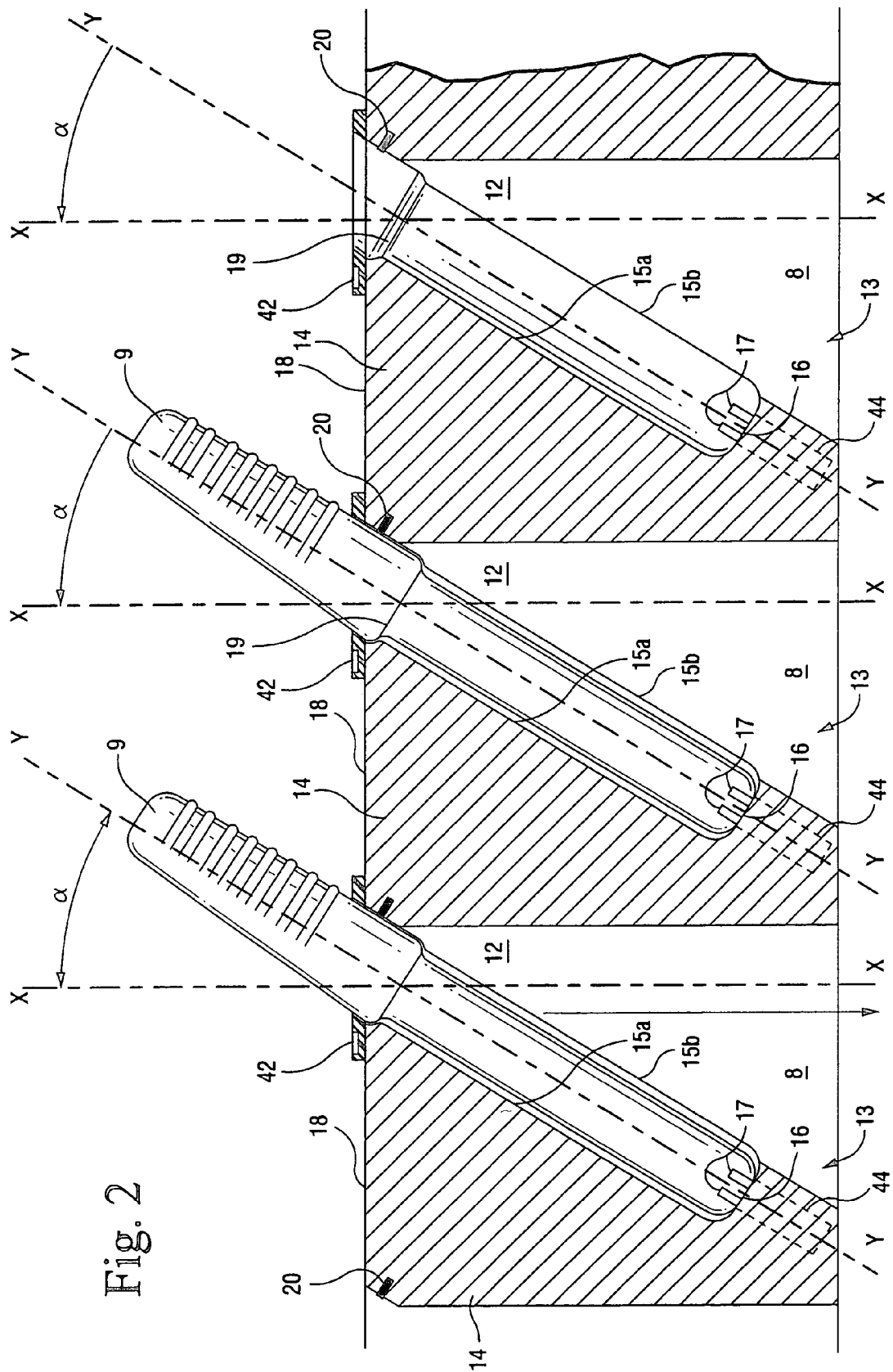
FIG. 2 shows a schematic and partly sectioned view of a detail of a terminal housing portion of the dispensing device of FIG. 1.

As regards the inner structure of compartments 8 for housing the terminals 9, as shown in FIG. 2, each compartment 8 comprises an upper aperture 12 for inserting the terminal 9, and a lower service aperture 13. The lower aperture 13 preferably has a size larger than that of the upper aperture 12, and arranged below the latter. A vertical axis X-X and a terminal insertion oblique axis Y-Y, inclined with respect to the vertical axis X-X by a predetermined angle α are defined in the upper aperture 12.

Inside each compartment 8 there is provided a terminal support element 14 provided with opposed walls 15a, 15b, inclined by predetermined angle α with respect to axis X-X, and adapted to constitute guiding surfaces for terminal 9 inserted into the compartment 8. The opposed walls 15a, 15b are guiding walls and define opposed end walls of terminal support element 14. A terminal support step 16 is formed onto the wall 15a. Angle α is predetermined so that the terminal support element 14, and thus the terminal support step 16, is outside the projection of aperture 12 along the vertical axis X-X, so as to allow the discharge of small objects that may enter the compartments 8, and for preventing dust collection into therein. As shown in FIG. 2, the terminal support step 16 is defined on a first surface, with no surface oriented differently to the first surface being provided to connect the support step 16 to the other guiding wall 15b of said opposed guiding walls 15a, 15b.

On the step 16 there are provided electric connectors 17 adapted to co-operate with respective connectors provided onto the base surface of the terminal 9. The co-operating connectors 16, 17 allow the recharge of the batteries of the terminal 9 and/or data uploading or downloading to and from the terminal 9 before and after the self-scanning operations, so as to proceed, in this last case, to the computing operations of the overall amount to be paid. The upload and download (or transmission and reception) of the data with the terminals, as it will be better explained hereinafter, can also occur through optical (for example, IrDA) or radio communication.

In the assembling operations of the dispensing device 1, the boxes including the compartments 8 can be inserted into the box-shaped body 7 of container 2 complete with the terminal support elements 14, with electronic cards and wirings. The box wiring connection to the main wiring of the dispensing device is possible through special connectors provided on the short sides of the box itself.

The box-shaped body 7 comprises a covering surface 18 provided with a plurality of holes 19. Each hole 19 is provided at each corresponding upper aperture 12 of compartments 8. Surface 18 is of primary importance both for aesthetic and functional reasons. Since the dispensing device is displayed in environments open to the public, it is important that it have a good aesthetic finishing. Moreover, the covering surface is resistant with no degradation to light shocks to which the dispensing device may be subject in the environment where it is arranged.

When inserted into the appropriate compartment 8, the terminal 9 protrudes by about ⅔ of its length, so as to offer an easy grip to the authorised customer. The entry of the compartment is wide, strongly smoothed and progressively narrowing, so as to guarantee, on the one hand, an easy insertion of the terminal and, on the other hand, a precise arrangement of the same, when completely inserted.

In each compartment 8 there is provided a locking/unlocking device for terminals 9, which prevents withdrawal any unauthorised or unidentified person. The locking/unlocking device can be, for example, mechanical, electromagnetic or magnetic. FIG. 2 shows an embodiment of said device which provides for the use of a mobile pin 20 adapted to be fixed into a suitable notch provided onto the terminal 9.

Inside each compartment 8 there are also provided one or more sensors (not illustrated) for detecting the presence of terminal 9. The use of two sensors allows detecting not only the presence, but also the wrong arrangement (e.g. orientation) of terminal 9 into the compartment 8, due (for example) to the presence of foreign matter. Moreover, there is provided a luminous indication system to be actuated for showing to the customer the terminal to be used (for example, a LED 42 (see FIG. 2) arranged on the upper surface of each compartment, or all around it), and a terminal lifting mechanism 44 which lifts the terminal after it has been selected (for example, an electromechanical or magnetic mechanism).

Moreover, inside the compartment 8 there is present a communication system that allows the terminal inserted into the compartment to communicate with the dispensing device control unit. This connection can be implemented in various ways. In particular, it can be a physical connection, through the electric connectors 17 arranged on the step of the terminal support element 14, or it can be optical, through an optical transceiver arranged into compartment 8, or a radio connection, through a radio connection to a transceiver arranged into compartment 8 or centralised.

Inside each compartment 8 there is present a microprocessor which communicates with a control card of the control unit of dispensing device 1 for performing the commands received from it (battery charge/discharge, indication of the terminal to be withdrawn, data upload and download to and from the terminal, lock/unlock actuation).

The dispensing device of the present invention allows the use of terminals supplied with different types of batteries (characterised by different charge modes) that are recognised through a device (for example a magnet) integrated into the pack of batteries, and whose presence is detected by a circuit which is present into the compartments 8 (for example, a Hall-effect sensor).

Inside the dispensing device 1, there is provided the arrangement of one or more printers 46 used for printing the identification ticket of the shopping operation carried out, or for printing coupons and/or marketing messages addressed to the customer before or after the shopping operation. Preferably, the printers 46 are orientated at both the main sides of the dispensing device, and are arranged so as to allow a quick identification and the immediate withdrawal of tickets and/or coupons. The identification of the printer from which the ticket is to be withdrawn after restitution of the terminal is facilitated by the use of matching colours between ticket output window and terminal compartments and/or by the use of flashing LEDs 48 arranged in the proximity of the printers.

As shown in FIGS. 3 and 4, the dispensing device 2 is adapted to operate in an integrated system 100 for dispensing portable terminals arranged in the shopping centre (schematically indicated in the figures with reference numeral 50) and, more in general, in an integrated product sales system in the shopping centre. The integrated system 50 provides for the use of one or more dispensing devices 1, of a (central) control station 80 of the dispensing device(s) 1, and of a connection network 60 between the dispensing device(s) and the control station for allowing the exchange of information between them. Thus, as single interfaces to the outside, the container 2 exhibits a connection with the power supply and a connection to the control station 80 of the same. Moreover, station 80 is connected to one or more cash registers 90.

Preferably, the control station 80 is in remote position with respect to dispensing device 1, and it is connected to the latter through wired or wireless local network, or through geographic (wide area) network.

In turn, the control station 80 can be connected to a management centre 150, for example a management centre to which are connected, through wired or wireless local network, or geographic network, various shopping centres of the same sales network.

The complete management of all the functions of the dispensing device and of the integrated system of the present invention is preferably carried out in a remote way. The preferable project choice is that of using WEB technologies also for the connection to the management centre 150. From the management centre 150 it is possible to: generate statistical reports on the sales activity carried out by the dispensing device, configure the operation of the dispensing device, configure the terminals, monitor the operation of the dispensing device and of the terminals.

Terminals 9 are advantageously provided with a data reader (and optionally also writer), for example a code reader of code (optical, magnetic, electronic, and images) provided on each product.

In a first embodiment of the dispensing device of the present invention, terminals 9 are provided with radio connection. The radio connection can be implemented through a wireless local network, hereinafter indicated with WLAN (for example, IEEE 802.11 radio) or through geographic network, hereinafter indicated with WAN (for example, radio-mobile GSM, GPRS or UMTS). Said terminals (also called RF terminals) use the radio connection to communicate with dispensing device 1 during the shopping step. In this case, the RF terminal serves as a client that uses the dispensing device (which operates as a server) for any shopping operation: all data allowing the product sale reside in the dispensing device, which provides them to the terminal only when they request it. Moreover, the dispensing device maintains the list of the products purchased by that particular customer (shopping basket). The communication between RF terminal and dispensing device is preferably based on the use of standard WEB protocols. The same terminal can be provided only with a WEB browser.

In a second embodiment of the dispensing device of the present invention, terminals 9 are without radio connection. The software and data needed for carrying out the shopping operation in total autonomy with respect to the dispensing device are uploaded to these terminals (also called Batch terminals) by the dispensing device.

On the basis of the type of terminal 9 used, the shopping operation can occur according to different modes. According to a first mode (called Two-steps-and-go, and illustrated in FIG. 3), the customer must return terminal 9 to the dispensing device 1, which downloads the shopping data from the terminal, prints an identification ticket of the shopping carried out, and transmits to the control station 80 of the seller the data allowing the payment of the shopping at one of the checkout counter 90.

According to a second shopping mode (called One-step-and-go, and illustrated in FIG. 4), the customer does not return the terminal into the dispensing device 1 after the shopping operation, but instead directly brings it to counter 90. Depending on the type of terminal used, the registration and closure of the shopping can occur in either of two ways. The first way is the case of BATCH terminals, through direct communication between terminal 9 and checkout counter 90. In this case, the terminal 9 is placed into an appropriate cradle 95 provided in proximity of counter 90. Terminal then communicates to the counter 90 the data for printing the ticket through the control station 80 or directly (see FIG. 4).

The second way is the case of RF terminals, through communication between dispensing device 1 and counter 90. Terminal 9 recognises the end of the shopping operations (for example, by the reading of a special bar code by the counter operator) and communicates it to the dispensing device through the connection network 60. In turn, the dispensing device send the data for printing the ticket (passing from the control station 80 which controls counters 90). In this case, the customer does not need to return to the dispensing device before exiting.

The dispensing device of the present invention has the possibility of using, for the shopping operations, also RF terminals which are external with respect to those housed into compartments 8. For example, it is possible to use RF terminals of the PDA and Pager type, radio-mobile units (GSM, UMTS, etc.) that can communicate on any wireless transport means with WEB standard protocols (TCP/IP, HTTP, XML, WAP, etc.) and provided with a data code reader belonging or given for personal use to the customers of the shopping centre. In this case, after the identification of the customer, which can be carried out both manually and automatically, as described hereinafter, the actual terminal withdrawal step is skipped over, and the customer can start his shopping operation with his own terminal exactly in the same way as he would use an RF terminal withdrawn from the dispensing device. This function is made possible by the use of standard WEB technologies for the communication between dispensing device and terminal during the shopping. Actually, the dispensing device works as a portal which provides the self-scanning service to both the customers into the shopping centre and to the customers outside it, for example at their home, allowing the Home scanning (for example on a catalogue or on products to be re-ordered), or Home shopping.

Thus, as regards the customer identification means, two main categories of identification systems are possible: manual systems and automatic systems.

Manual systems comprise, for example, a magnetic card reader, a smart card reader, a bar-code card reader, an optical receiver, etc. In all these systems, the seller provides the customer with a card on the basis of its use criteria (for example, members, regular customers, etc.). This card could also be a normal credit card or card for cash dispenser. In this case, an adjustable monitor 11 can be provided, on which there are displayed the operating instructions for using the system, such as (for example) the indication of the terminal to be withdrawn or the request of typing a PIN CODE. In consideration of its standard size, the monitor can also be used for sending marketing communication messages and/or various advertisement messages (videos, static and active banners, etc.). Moreover, there can be present an alphanumerical keyboard for typing a PIN code (usually implemented with a touch screen system connected to the monitor) and a loudspeaker system for transmitting sound messages or music.

The identification operation is carried out under the control of the control unit of the dispensing device. After the card has been inserted into the reader, the control unit commands the reading of the same card and carries out the identification of the customer using information inserted into its database or forwarding (through network) the request for identification to the control station 80. Moreover, the control unit carries out the control of the typed code and provides to select and visually indicate to the customer a terminal 9 to be used for the shopping operations. One of the visual indications provided is graphical, and is displayed on the monitor 11.

In the preferred embodiment, the customer identification system uses WEB technologies for the visual indication to the customer.

The automatic systems provide for the use of identification means characterised by a very high safety level and by a very low interaction degree between the identification tool and the user so as to facilitate its use. Such systems comprise, in particular, a receiver capable of accepting optical (for example, IrDA), radio (for example, Bluetooth), mobile phone (for example, GSM telephone), radiofrequency tag, JAVA Ring connections, etc. In all these cases, the receiver is capable of accepting the connection and identification request coming from a terminal (such as PDA, pager, GSM telephone, or UMTS), checking the customer identification data by comparing it with the known ones, optionally requesting a PIN code or a password to be typed directly on the terminal withdrawn by the customer. The communication protocols used can be of a various types, such as for example Web protocols on wireless local or radio network with short-range, such as Bluetooth (useful for example when using PDA), or dedicated protocols (useful for example when using GSM or UMTS telephones). A variant of this solution provides for the use of voice recognisers, fingerprint recognisers and retinae recognisers.

During the user identification step it is also possible to get information on the payment system that the customer wants to use (for example, credit card). Said information can be passed to the control station 80 so as to further automate (and thus speed up) the registration step at the end of the shopping operation. In fact, in this way, the customer does not need to show his credit card at the checkout counter.

The payment information can also be directly exchanged with the terminal owned by the customer if said terminal is provided with an integrated electronic payment system (e-wallet). In this case, the dispensing device has the function of guaranteeing the transactions, by interposing itself between the customer and the seller: a customer is enabled to use his payment system after having identified himself at the dispensing device and after having communicated to the latter the information of the payment transaction.

Moreover, the dispensing device is capable of directly interfacing with the information system managing the payments external to the seller, and managing payment transactions without passing through the control station 80. As soon as the customer identifies himself, the dispensing device can implement a network connection to the remote payment system and request the authorisation to the use of the electronic payment. At the end of the shopping operation, the dispensing device carries out the payment transaction.

The functions carried out by the control unit of dispensing device 1, can be one or more of the following:
- management of the terminals during their permanence into the dispensing device;
- customer identification;
- terminal dispensing;
- enabling the use of terminals belonging to the customers;
- management of the operations relating to the sale;
- management of the operations relating to the registration step at the end of the shopping operations;
- management of the communication with the seller's information system.

In particular, the management of the terminals comprises managing the terminal's batteries, updating the software and the data loaded on the terminals, and checking the terminal's state.

The battery management is an important aspect of the self-scanning system of the invention. In fact, it is necessary to both prevent dispensing to the customers terminals provided with little charge autonomy, and charging already charged batteries, for the purpose of increasing their lifetime.

For this purpose, the self-scanning system of the invention adopts an intelligent battery management system based on the estimate of the current consumption of the terminals during their activity or, alternatively, on the information directly provided by battery charge measuring systems integrated in the battery packs. On the basis of the collected data, the control unit has the possibility of deciding when to charge the battery of a terminal. Moreover, the control unit has the function of deciding whether to carry out complete charge and discharge operations so as to regenerate the batteries, using for example inactivity periods of the system (for example, low-stream hours, closing hours, etc.).

The software loaded on the terminals can be directly updated from the dispensing device so as to facilitate any maintenance operation. The same applies to the data loaded on the terminals (especially for BATCH terminals). The control unit has the possibility of deciding to update terminal software and data.

Finally, the check of the terminal state allows to indicate a possible malfunction detected in the terminals, such as for example battery short circuits, wrong insertion of the terminal into the cradles, etc.

The customer identification function is managed by the control unit on the basis of the information present into it or provided by the control station 80.

The dispensing of the terminal to the customers occurs on the basis of the (assumed) state of charge of the batteries and of the update degree (software and data) of the terminals currently present into the dispensing device. After having selected the terminal, the control unit provides to command the unlocking of the selected terminal and to indicate it to the customer (for example, through the lighting up of a LED arranged near it and optional lifting of the terminal in the respective compartment). Moreover, a graphical representation of the terminal to be withdrawn and of the manual operation to be carried out is displayed on the identification monitor 11 concurrently with a sound message.

As already said, the control unit also allows the use of terminals belonging to the customers, such as PDA, pagers, mobile phones, etc., capable of connecting to the dispensing device through the standard WEB protocols used by the same dispensing device. The management of the terminals is totally equal to that of the terminals of the dispensing device, with the exception of the dispensing step of the same, which is actually eliminated.

The management of the operations relating to the sales step is different depending on the type of terminal used.

With RF terminals, the data that allows carrying out the sales operations (PLU—Price Look Up, promotions, discounts, etc.) is maintained in a database of the dispensing device by the control unit, whereas on the terminals there is available only the software that allows making queries to the database of the dispensing device. The connection between terminals and dispensing device occurs using standard WEB protocols (TCP/IP, HTTP, XML, WAP, etc.). The terminal actually functions as a client, while the control unit is the server. For example, a terminal may be provided with a WEB browser. More in particular, the control unit uses a commercial WEB server program (such as for example Microsoft Internet Information Server) for providing its services to the terminals. Especially important is also the use of the XML language for the representation in universal format of the transferred data.

With BATCH terminals, the control unit must upload the data allowing the sale and the sales software directly to the terminal before it is delivered to the customer.

Also the management of the operations relating to the registration step at the end of the shopping operation is different according to the type of terminal used and to the shopping modes. In the Two-steps-and-go solution with BATCH terminals, when the customer returns the terminal to the dispensing device, the control unit has the function of downloading the shopping data, printing the ticket, connecting to the information system that manages the payments and sending all the information on the shopping carried out. In the One-step-and-go solution with RF terminals, the control unit sends the information on the shopping carried out to the information system that manages the payments after having read a particular code by the checkout counter operator.

The self-scanning system of the invention is advantageously arranged for a modular growth. When the number of terminals needed in a shopping centre exceeds the maximum number provided for a single dispensing device, it is possible to add a new dispensing device and so on, with no particular limits. The functions, the usage modes for the customers and the management modes for the seller of a shopping centre with more dispensing devices are exactly the same as those of a single dispensing device. Each dispensing device appears to the customer as an independent machine, with the advantage of having the possibility of selecting any dispensing device in which to return the terminal at the end of the shopping operations. Preferably, the various dispensing devices communicate with one another for exchanging status information, software for the terminals and data.

The main functions of the dispensing device and of the dispensing and sales system of the present invention can thus be listed as follows:

- containing the terminals during the periods when they are not used, providing to recharge their batteries and to update the data contained into them;
- dispensing the terminals to the customers enabled to their use, allowing the withdrawal of the terminal after an identification procedure;
- guiding the identified customers to the withdrawal of the terminal assigned to them in a simple and clear way through visual messages on a monitor, sound messages diffused by a loudspeaker and a luminous indication identifying the terminal to be withdrawn;
- managing the shopping steps carried out by the customers maintaining all the information needed for the purpose (for example, product price, discount and promotion look up tables, direct marketing data, purchase historical file, etc.);
- sending marketing messages to the customers (promotions, discounts, advertisements in general);
- generating check reports on the activity carried out by the self-scanning system for the seller;
- maintaining the connection with the control station of the seller exchanging with it the purchase, marketing and customer identification data.

The integrated self-scanning system of the invention is capable of dispensing not only actual terminals, but also simple optical-code readers which in turn interface to terminals belonging to the customers (for example, PDA, pagers, mobile phones, etc.). The application scenario is as follows: the customer provided with his own terminal connected by Internet with any type of wireless local or geographic network (radio-mobile, IEEE802.11) but without code reading head, enters into a shopping centre provided with the integrated system of the present invention. Then, he identifies himself through the automatic identification system of the dispensing device and he is thus enabled to withdraw a reading device, which connects to the customer's terminal electrically or via radio. The shopping occurs as with a normal terminal of the present generation, except in that in this case the terminal consists of two parts. Also the shopping registration occurs in the classical way, and the reader is returned to the dispensing device or at the checkout counter.

The advantage of this type of solution is in the fact that it does not oblige the customer to have a personal terminal provided with code reader, but he can use his personal terminal (PDA, pager, radio-telephone). The seller provides him, through the dispensing device, with the optical-code reader accessory together with self-scanning solutions. The fast technological evolution may bring to have very small mobile personal terminals provided with very sophisticated interfaces (for example, tiny displays, sound and more) and capable of being functionally expanded in a standard way (for example via Bluetooth).

The integrated system of the present invention allows implementing a marketing communication system and/or direct marketing system between seller and customers, aiming at increasing their loyalty degree. Marketing communications are made possible thanks to the customer identification, to the possibility provided by the dispensing device of the invention of sending messages to the customer, and to the data collection (carried out by the dispensing device) of the shopping operations carried out by that customer in the past, so as to have indications on his obvious preferences and habits. Through the analysis of the historical data relating to the purchases carried out by the customer, to the information relating to the demographic profile of the single customer, and to the implementation of different promotions on a product for each customer, the seller can implement effective marketing strategies so as to better meet the requirements of the single customers, such as for example the management of the loyalty points programs, the issue of individual discounts, prize contests, printed coupons for communications to the single customers, etc. The means used for sending messages to the customer are: printers, terminals, system monitors, customer identification monitors, double plasma monitor arranged above the dispensing device and connected to the control unit and to the control station of the system (for example, this double monitor can serve for showing videos, and into the dispensing device there may also be arranged a DVD player).

The self-scanning system of the present invention is capable of printing a series of coupons whose promotions, valid for the shopping operations in progress or for a longer period, are addressed to single customer starting from the processing of his purchase habits and his preferences. Said promotions can include: a present on the occasion of a particular festivity for the customer, a free ticket for a lottery, a discount on an item that the customer has not purchased for some time, a discount on an item so as to make the customer test it, newsletters, recipes etc. The coupon can be printed as the customer starts purchasing, or at the end of the same. The coupon can include a code that is read at the checkout counter so as to calculate a refund. Moreover, the customer can be registered with any one of the stores of the sales network since the self-scanning system guarantees the circulation of the customer data.

Together with dispensing device of the present invention, a support for graphics is available as accessory for communication and/or advertisement. It is an accessory component mounted on the dispensing device and adapted to support promotional or advertising posters. Moreover, cradles 95 are available for terminals to be used in the solution wherein the customer hands the terminal out at checkout counter 90 at the end of the shopping operations (One-step-and-go shopping mode). These cradles 95 connect to the checkout counter 90 both through a wired line (for example, RS232, OCIA, USB, etc.), and through radio connection (WLAN, Bluetooth, etc.). Moreover, there are available systems for recharging the terminal battery packs.

The man skilled in the art will clearly note that all the solutions, systems and software described above with reference to the terminal dispensing device of the present invention can be carried out and implemented in the same way also on different dispensing device.

Moreover, it will be evident that the self-scanning system described above, besides operating with terminals dispensed by suitable dispensing devices, such as that of the present invention, can operate also with personal terminals (or belonging to the customers) or even only with personal terminals. In these last cases, the system is capable of automatically recognising the customers through the recognition of their personal terminals. As for the rest, all the operations described above, such as for example the product data acquisition and download, and their subsequent processing for computing the amount to be paid, as well as the information exchange functions between terminals and systems, are identical to those described above. Moreover, it is evident that, in the case of operation only with personal terminals, the terminal dispensing function is not needed any more, and that the single function of automatic identification of personal terminals is sufficient for the system to proceed with the subsequent steps of product data acquisition, download, and processing.

For small shopping centres, wherein the installation of a complete dispensing device is too expansive, it is possible to use a reduced version of the dispensing device integrated with the checkout counter desk. In this configuration, the entrance and the exit to/from the shop occur in the same point. The customer identification function may be, for example, carried out by the counter operator and the latter may dispense the terminals to the customers by withdrawing them from the dispensing device, and arrange them into the dispensing device at the end of the shopping operation. Thus, the registration at the and of the shopping always occurs by handing the terminal out at the checkout counter.

In conclusion, the dispensing device and the self-scanning system of the present invention allow to achieve the following advantages:
new way of dispensing the terminals, through a single compact, mobile and functional container;
multifunctional user interface based on multimedia technology;
simplicity of location of the terminal to be withdrawn;
integrated marketing communication functions that make the terminal dispensing device an integrated support and communication system to the customer;
WEB-based open processing architecture;
possibility of using terminals external to the system;
new registration mode for BATCH terminals;
possibility of using devices such as PDA, pager, mobile phones, etc., belonging to the customer in place of terminals dispensed by the dispensing device.

The invention claimed is:

1. A dispensing device of portable terminals having means for acquiring data relating to products to be purchased by customers in a shopping centre, comprising:
a plurality of cradles for a corresponding plurality of portable terminals to be withdrawn and used by the customers of the shopping centre for product data acquisition;
means for identifying each customer enabled to use the portable terminals;

means for communicating to each identified customer, a corresponding terminal to be withdrawn among said plurality of terminals for the product data acquisition;

a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;

wherein said plurality of cradles, said identifying means, said communicating means, and said control unit are housed in a single housing, and wherein all the cradles are housed in a substantially flat portion of said housing, said portion being provided in close proximity of the customer identifying means so as to allow access to said plurality of terminals;

wherein said portion for housing said terminals comprises a body including a plurality of compartments constituting said plurality of terminal cradles;

wherein each compartment of said plurality of compartments comprises:

a terminal support element comprising opposed guiding walls inclined by a predetermined angle with respect to a vertical axis, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

2. A dispensing device according to claim 1, wherein said portion for housing said terminals is substantially horizontal.

3. A dispensing device according to claim 1, wherein each compartment of said plurality of compartments is adapted to house a terminal of said plurality of terminals and comprises locking/unlocking means of the terminal housed therein.

4. A dispensing device according to claim 1, wherein said body comprises first electrical connectors adapted to cooperate with second electrical connectors provided on the terminals.

5. A dispensing device according to claim 1, wherein each compartment of said plurality of compartments comprises a terminal support element arranged inside each compartment, substantially away from a projection of the first aperture along a vertical axis.

6. A dispensing device according to claim 5, wherein said terminal support element comprises opposed guiding walls inclined at said predetermined angle with respect to said axis, and wherein one of said walls comprises a support step for contacting a lower end of the terminal, the support step being arranged outside the projection of the first aperture along a vertical axis.

7. A dispensing device according to claim 1, wherein said body comprises a covering surface provided with a plurality of holes at said first terminal insertion apertures.

8. A dispensing device according to claim 1, further comprising means for moving the housing.

9. A dispensing device according claim 1, wherein the customer identifying means comprises at least any one of the following means: a magnetic card reader, a smart card reader, a bar-code card reader, an optical receiver, a radio or mobile phone receiver, a fingerprint reader, a fingerprint or retina detector, a device for entering a numerical code, a voice detector.

10. A dispensing device according to claim 1, wherein the means for communicating to identified customers the terminals to be withdrawn comprises at least any one of the following means: visual communication means on a display or monitor, visual communication means in the proximity of each cradle of said plurality of cradles, sound or voice communication means, terminal lifting means provided into each cradle of said plurality of cradles.

11. A dispensing device according to claim 1, wherein the communicating means provides one of marketing information, promotional information and a discount voucher.

12. A dispensing device according to claim 1, further comprising one of the following:

data transmission means to an optical-type terminal;

data transmission means to a radio-type terminal;

data transmission means from an optical-type terminal; and data transmission means from a radio-type terminal.

13. A dispensing device according to claim 1, wherein said housing comprises a charge/discharge circuit for batteries of the terminals.

14. A dispensing device according claim 1, wherein each compartment comprises at least one sensor for indicating presence and/or correct arrangement of the terminal into the compartment.

15. A dispensing device according to claim 1, wherein said housing comprises means for printing one of ticket, marketing or promotional information and a discount voucher.

16. An integrated system for the automatic dispensing of portable terminals having means for acquiring data relating to products to be purchased by customers in a shopping centre, comprising:

at least one dispenser of portable terminals for acquiring product data in a shopping centre;

a control station of said at least one terminal dispenser;

a connection network between said at least one terminal dispenser and said control station so as to allow the exchange of information therebetween;

wherein said at least one dispenser comprises:

a plurality of cradles for a corresponding plurality of portable terminals to be withdrawn and used by the customers of a shopping center for product data acquisition;

means for identifying each customer enabled to use the portable terminals;

means for communicating to each identified customer, a corresponding terminal to be withdrawn among said plurality of terminals for the product data acquisition;

a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;

wherein said plurality of cradles, said identifying means, said communicating means and said control unit are housed in a single housing, and wherein all the cradles are housed in a substantially flat portion of said housing, said portion being provided in close proximity of the customer identifying means so as to allow access to said plurality of terminals;

wherein said portion for housing said terminals comprises a body including a plurality of compartments constituting said plurality of terminal cradles;

wherein each compartment of said plurality of compartments comprises:
a terminal support element comprising opposed guiding walls inclined by a predetermined angle with respect to a vertical axis, the opposed guiding walls defining opposed end walls of the terminal support element in a direction perpendicular to a terminal insertion direction;

wherein a support step for a louver end of the terminal extends from a first guiding wall of said opposed guiding walls, said support step being defined on a first surface, no surface oriented differently to the first surface being provided to connect the support step to the other guiding wall of said opposed guiding walls.

17. A system according to claim 16, wherein said control station is in remote position with respect to said at least one terminal dispenser.

18. A system according to claim 17, wherein said connection network is a wireless local network.

19. A system according to claim 17, wherein said connection network is a geographic network.

20. An integrated system according to claim 16, further comprising
means for downloading the product data acquired through the terminals;
means for computing, as a function of the acquired data, an amount to be paid.

21. A system according to claim 20, wherein said means for downloading the product data acquired through the terminals are housed in the terminal dispenser.

22. A system according to claim 20, wherein said means for downloading the product data acquired through the terminals are provided in remote position with respect to the terminal dispenser.

23. A system according to claim 20, further comprising at least one cash register for the payment of said amount.

24. A system according to claim 20, further comprising means for charging an amount to be paid directly to a bank account of the customer.

25. A system according to claim 20, wherein at least a portion of the terminals used for acquiring the product data is dispensed to the customers for personal use.

26. A system according to claim 20, wherein at least a portion of the terminals used for acquiring the product data is a code reading device provided with an interface for the connection with a personal terminal belonging to the customers.

27. A system according to claim 25, wherein the terminal has means for allowing automatic identification of the customer.

28. A system according to claim 20, wherein at least one of said terminals exchanges information with the control station through a wireless connection network.

29. A system according to 20, wherein at least one of the terminals receives, either visually or voice, one of marketing information, promotional information, and a discount voucher.

30. A system according to claim 24, wherein said means for charging the amount to be paid is controlled by the terminal.

31. An integrated system for the sales of products in a shopping centre, comprising:
portable terminals having means for acquiring data relating to products to be purchased by customers in the shopping center;
a dispensing device of said portable terminals;
means for identifying a customer enabled to use the portable terminals;
means for communicating to the identified customer a corresponding terminal to be withdrawn among said portable terminals for the product data acquisition;
a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;
means for downloading the product data acquired through a portable terminal dispensed to the identified customer;
means for computing, as a function of the acquired product data, an amount to be paid;
wherein at least one of said portable terminals is a code reading device provided with an interface for the connection with a personal terminal belonging to the customer;
wherein said dispensing device comprises a plurality of compartments for housing said portable terminals, wherein each compartment comprises:
a terminal support element comprising opposed guiding walls inclined by a predetermined angle with respect to a vertical axis, the opposed guiding walls defining opposed end walls of the terminal support element in a direction perpendicular to a terminal insertion direction;
wherein a support step for a lower end of the terminal extends from a first guiding wall of said opposed guiding walls, said support step being defined on a first surface, no surface oriented differently to the first surface being provided to connect the support step to the other guiding wall of said opposed guiding walls;
wherein all the compartments are housed in a flat portion of a single housing.

32. A dispenser of portable terminals, the portable terminals having means for acquiring data relating to products to be purchased by customers in a shopping center, the dispenser comprising:
a dispenser housing;
a plurality of compartments for accommodating a corresponding plurality of portable terminals to be withdrawn and used by the customers of the shopping centre for product data acquisition, all the compartments being housed in a substantially flat portion of said housing;
means for identifying a customer entitled to withdraw and use one of the portable terminals;
means for communicating to the entitled customer which one of the plural portable terminals is allocated to the entitled customer for use in product data acquisition;
a data control and processing unit which controls the identifying means and the communicating means;
wherein each compartment comprises:
an upper aperture for receiving a terminal inserted therein;
a compartment first guiding wall inclined at a predetermined angle with respect an axis orthogonal to said flat portion;
a support step provided on the compartment first wall for contacting a lower end of the terminal;
wherein a support step for a lower end of the terminal extends from a first guiding wall of said opposed guiding walls, the opposed guiding walls defining opposed end walls of the terminal support element in a direction perpendicular to a terminal insertion direction, said support step being defined on a first surface, no surface oriented differently to the first surface being provided to connect the support step to the other guiding wall of said opposed guiding walls.

33. The dispenser of claim 32, further comprising a compartment further wall which is opposed to the compartment first wall.

34. The dispenser of claim 32, wherein the support step has a first electrical connector thereon for mating with a second electrical connector on the terminal.

35. The dispenser of claim 32, where each compartment has a sensor for detecting at least one of presence and correct orientation of the terminal in the compartment.

36. The dispenser of claim 32, wherein each compartment has means for selectively locking the terminal in the compartment.

37. The dispenser of claim 32, wherein each compartment has a terminal lifting mechanism for selectively lifting the terminal allocated to the entitled customer relative to the compartment.

38. The dispenser of claim 32, wherein when contacting the support step, two-thirds of a longest aspect of the terminal along the predetermined angle extends out of the compartment.

39. A dispensing device according to claim 1, wherein said data control and processing unit further processes the product data acquired through said terminals.

40. A dispensing device according to claim 1, wherein at least one of said terminals is a code reading device provided with an interface for the connection to a personal terminal belonging to the customer.

41. A system according to claim 20, wherein at least one of said terminals is a code reading device provided with an interface for the connection to a personal terminal belonging to the customer.

42. A dispensing device of portable terminals having means for acquiring data relating to products to be purchased by customers in a shopping center, comprising:
   a plurality of cradles for a corresponding plurality of portable terminals to be withdrawn and used by the customers of the shopping centre for product data acquisition;
   means for identifying each customer enabled to use the portable terminals;
   means for communicating to each identified customer a corresponding terminal to be withdrawn among said plurality of terminals for the product data acquisition;
   a multifunctional customer interface for communicating with customers,
   a data control and processing unit connected to the identifying means, the communicating means, and the multifunctional customer interface, said control unit carrying out the identification of the customer by means of said identification means, associating the corresponding terminal to the identified customer and communicating to the identified customer the corresponding terminal to be withdrawn by means of said communicating means;
   wherein said plurality of cradles, said identifying means, said communicating means, said multifunctional customer interface, and said control unit are housed in a single housing and wherein all the cradles are housed in a substantially flat portion of said housing, said portion being provided in close proximity of the customer identifying means so as to allow access to said plurality of terminals;
   wherein said portion for housing said terminals comprises a body including a plurality of compartments constituting said plurality of terminal cradles;
   each compartment of said plurality of compartments comprising:
      a terminal support element comprising opposed guiding walls inclined by a predetermined angle with respect to a vertical axis, the opposed guiding walls defining opposed end walls of the terminal support element in a direction perpendicular to a terminal insertion direction;
      wherein a support step for a louver end of the terminal extends from a first guiding wall of said opposed guiding walls, said support step being defined on a first surface, no surface oriented differently to the first surface being provided to connect the support step to the other guiding wall of said opposed guiding walls.

43. A dispensing device according to claim 42 wherein said multifunctional customer interface is based on multimedia technology.

44. A dispensing device according to claim 42, wherein said multifunctional customer interface comprises at least one of the following means: visual communicating means on a display or a monitor; visual communication means in proximity of each cradle of said plurality of cradles; sound or voice communication means; terminal lifting means provided in each cradle of said plurality of cradles.

45. A dispensing device according to claim 42, wherein said multifunctional customer interface comprises means for printing at least one of the following elements: tickets, marketing information, coupons, promotional information coupons, and discount vouchers.

46. A dispensing device of portable terminals having means for acquiring data relating to products to be purchased by customers in a shopping centre, comprising:
   a plurality of cradles for a corresponding plurality of portable terminals to be withdrawn and used by the customers of the shopping centre for product data acquisition;
   means for identifying each customer enabled to use the portable terminals;
   means for communicating to each identified customer, a corresponding terminal to be withdrawn among said plurality of terminals for the product data acquisition;
   a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;
   wherein said plurality of cradles, said identifying means, said communicating means, and said control unit are housed in a single housing, and wherein all the cradles are housed in a substantially flat portion of said housing, said portion being provided in close proximity of the customer identifying means so as to allow access to said plurality of terminals;
   wherein said portion for housing said terminals comprises a body including a plurality of compartments constituting said plurality of terminal cradles;
   and wherein each of said compartments extends longitudinally along a direction inclined by a predetermined angle with respect to said flat portion;
      wherein each compartment comprises:
         a terminal support element comprising opposed guiding walls, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

47. A dispensing device according to claim 46, wherein an axis orthogonal to said flat portion is defined and a terminal insertion axis inclined by a predetermined angle with respect to the said axis is defined; and wherein each compartment comprises
means for guiding the terminal into the compartment.

48. An integrated system for the automatic dispensing of portable terminals having means for acquiring data relating to products to be purchased by customers in a shopping centre, comprising:
at least one dispenser of portable terminals for acquiring product data in a shopping centre;
a control station of said at least one terminal dispenser;
a connection network between said at least one terminal dispenser and said control station so as to allow the exchange of information therebetween;
wherein said at least one dispenser comprises:
a plurality of cradles for a corresponding plurality of portable terminals to be withdrawn and used by the customers of a shopping centre for product data acquisition;
means for identifying each customer enabled to use the portable terminals;
means for communicating to each identified customer, a corresponding terminal to be withdrawn among said plurality of terminals for the product data acquisition;
a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;
wherein said plurality of cradles, said identifying means, said communicating means and said control unit are housed in a single housing, and wherein all the cradles are housed in a substantially flat portion of said housing, said portion being provided in close proximity of the customer identifying means so as to allow access to said plurality of terminals;
wherein said portion for housing said terminals comprises a body including a plurality of compartments constituting said plurality of terminal cradles; and
wherein each of said compartments extends longitudinally along a direction inclined by a predetermined angle with respect to said flat portion; and wherein each compartment comprises:
a terminal support element comprising opposed guiding walls inclined by a predetermined angle with respect to a vertical axis, the opposed guiding walls defining opposed end walls of the terminal support element in a direction perpendicular to a terminal insertion direction;
wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

49. An integrated system according to claim 48, wherein an axis orthogonal to said flat portion is defined and a terminal insertion axis inclined by a predetermined angle with respect to said axis is defined; and wherein each compartment comprises
means for guiding the terminal into the compartment.

50. An integrated system for the sales of products in a shopping centre, comprising:
portable terminals having means for acquiring data relating to products to be purchased by customers in the shopping centre;
a dispensing device of said portable terminals;
means for identifying a customer enabled to use the portable terminals;
means for communicating to the identified customer a corresponding terminal to be withdrawn among said portable terminals for the product data acquisition;
a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;
means for downloading the product data acquired through a portable terminal dispensed to the identified customer;
means for computing, as a function of the acquired product data, an amount to be paid;
wherein at least one of said portable terminals is a code reading device provided with an interface for the connection with a personal terminal belonging to the customer,
wherein said dispensing device comprises a housing and a plurality of compartments for housing said portable terminals, all the compartments being housed in a substantially flat portion of said housing,
wherein each of said compartments extends longitudinally along a direction inclined by a predetermined angle with respect to said flat portion; and wherein each compartment comprises:
a terminal support element comprising opposed guiding walls inclined by a predetermined angle with respect to a vertical axis, the opposed guiding walls defining opposed end walls of the terminal support element in a direction perpendicular to a terminal insertion direction;
wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

51. An integrated system according to claim 50, wherein an axis orthogonal to said flat portion is defined and a terminal insertion axis inclined by a predetermined angle with respect to said axis is defined; and wherein each compartment comprises means for guiding the terminal into the compartment.

52. A dispenser of portable terminals, the portable terminals having means for acquiring data relating to products to be purchased by customers in a shopping centre, the dispenser comprising:
a dispenser housing;
a plurality of compartments for accommodating a corresponding plurality of portable terminals to be withdrawn and used by the customers of the shopping centre for product data acquisition, all the compartments being housed in a substantially flat portion of said housing;

means for identifying a customer entitled to withdraw and use one of the portable terminals;

means for communicating to the entitled customer which one of the plural portable terminals is allocated to the entitled customer for use in product data acquisition;

a data control and processing unit which controls the identifying means and the communicating means;

wherein each of said compartments extends longitudinally along a direction inclined by a predetermined angle with respect to said flat portion; and wherein each compartment comprises:

a terminal support element comprising opposed guiding walls inclined by a predetermined angle with respect to a vertical axis, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

53. A dispenser according to claim 52, wherein each compartment comprises:

a compartment first guiding wall inclined at a predetermined angle with respect an axis orthogonal to said flat portion is defined; and a support step provided on the compartment first wall for contacting a lower end of the terminal.

54. A dispensing device of portable terminals having means for acquiring data relating to products to be purchased by customers in a shopping centre, comprising:

a plurality of cradles for a corresponding plurality of portable terminals to be withdrawn and used by the customers of the shopping centre for product data acquisition;

means for identifying each customer enabled to use the portable terminals;

means for communicating to each identified customer a corresponding terminal to be withdrawn among said plurality of terminals for the product data acquisition;

a multifunctional customer interface for communicating with customers, a data control and processing unit connected to the identifying means, the communicating means, and the multifunctional customer interface, said control unit carrying out the identification of the customer by means of said identification means, associating the corresponding terminal to the identified customer and communicating to the identified customer the corresponding terminal to be withdrawn by means of said communicating means;

wherein said plurality of cradles, said identifying means, said communicating means, said multifunctional customer interface, and said control unit are housed in a single housing and wherein all the cradles are housed in a substantially flat portion of said housing, said portion being provided in close proximity of the customer identifying means so as to allow access to said plurality of terminals;

wherein said portion for housing said terminals comprises a body including a plurality of compartments constituting said plurality of terminal cradles;

and wherein each of said compartments extends longitudinally along a direction inclined by a predetermined angle with respect to said flat portion; and wherein each compartment of said plurality of compartments comprises:

a terminal support element comprising opposed guiding walls inclined by a predetermined angle with respect to a vertical axis, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

55. A dispensing device according to claim 54, wherein an axis orthogonal to said flat portion is defined and a terminal insertion axis inclined by a predetermined angle with respect to the said axis is defined; and wherein said plurality of compartments comprises means for guiding the terminal into the compartment.

56. A dispensing device of portable terminals having means for acquiring data relating to products to be purchased by customers in a shopping centre, comprising:

a plurality of cradles for a corresponding plurality of portable terminals to be withdrawn and used by the customers of the shopping centre for product data acquisition;

wherein all the cradles are housed in a substantially flat portion of a single housing;

means for identifying each customer enabled to use the portable terminals;

means for communicating to each identified customer, a corresponding terminal to be withdrawn among said plurality of terminals for the product data acquisition;

a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;

and wherein said portion for housing said terminals comprises a body including a plurality of compartments constituting said plurality of terminal cradles, wherein each compartment of said plurality of compartments comprises:

a terminal inclined by a predetermined angle with respect to a vertical axis is defined, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

57. A dispenser of portable terminals, the portable terminals having means for acquiring data relating to products to be purchased by customers in a shopping centre, the dispenser comprising:

a dispenser housing;

a plurality of compartments for accommodating a corresponding plurality of portable terminals to be withdrawn and used by the customers of the shopping centre for product data acquisition, all the compartments being housed in a substantially flat portion of said housing;

means for identifying each customer enabled to use the portable terminals;

means for communicating to each identified customer, a corresponding terminal to be withdrawn among said plurality of terminals for the product data acquisition;

a data control and processing unit connected to the identifying means and the communicating means, said control unit carrying out the identification of the customer by means of said identification means, associating the corresponding terminal to the identified customer and communicating to the identified customer the corresponding terminal to be withdrawn by means of said communicating means;

wherein said portion for housing said terminals comprises a body including said plurality of compartments, and wherein each of said compartments extends longitudinally along a direction inclined by a predetermined angle with respect to said flat portion;

and wherein each of said compartments comprises:

a terminal support element comprising opposed guiding walls inclined by a predetermined angle with respect to a vertical axis, the opposed guiding walls defining opposed end walls of the terminal support element in a direction perpendicular to a terminal insertion direction;

wherein a support step for a lower end of the terminal extends from a first guiding wall of said opposed guiding walls, said support step being defined on a first surface, no surface oriented differently to the first surface being provided to connect the support step to the other guiding wall of said opposed guiding walls.

* * * * *